(12) United States Patent
Tanaka

(10) Patent No.: US 6,939,010 B2
(45) Date of Patent: Sep. 6, 2005

(54) DATA PROJECTOR APPARATUS

(75) Inventor: Yuya Tanaka, Daito (JP)

(73) Assignee: Funai Electric Co. Ltd., Osaka (JP)

( * ) Notice: Subject to any disclaimer, the term of this patent is extended or adjusted under 35 U.S.C. 154(b) by 0 days.

(21) Appl. No.: 10/795,030

(22) Filed: Mar. 5, 2004

(65) Prior Publication Data

US 2004/0179171 A1 Sep. 16, 2004

(30) Foreign Application Priority Data

Mar. 11, 2003 (JP) .................................... 2003-001239

(51) Int. Cl.[7] ............................................ G03B 21/16
(52) U.S. Cl. ........................................ 353/52; 353/57
(58) Field of Search ............................ 353/57, 58, 60, 353/61, 119, 52

(56) References Cited

U.S. PATENT DOCUMENTS 6,398,366 B1 * 6/2002 Hara et al. ..................... 353/57

FOREIGN PATENT DOCUMENTS

| JP | 2000-035614 | 2/2000 | ............ G03B/21/16 |
| JP | 20001-330818 | 11/2001 | ......... G02F/1/1333 |
| JP | 2002-148716 | 5/2002 | ............ G03B/21/16 |
| JP | 2002-214703 | 7/2002 | ............ G03B/21/00 |

OTHER PUBLICATIONS

Concise Statement of Relevance (1 pg.).
Japanese Search Report dated May 1, 2003 (5 pgs.).
Patent Abstracts of Japan; Publication No. 2002–148716 dated May 22, 2002 (2 pgs.).

* cited by examiner

*Primary Examiner*—William C. Dowling
(74) *Attorney, Agent, or Firm*—Osha Liang LLP

(57) ABSTRACT

A light source, a device, a fan, a board part, and the like are arranged at their respective predetermined positions within a housing of a data projector apparatus. The light source and the device are arranged closer to the front panel. The board part is arranged on the rear side that is opposite to the front panel. The fan is arranged between the light source and the board part. An air intake port is formed on the side of housing for taking air into the housing. An air exhaust port is formed at the front panel for exhausting the air within housing. An aluminum tape member is attached on the backside of the front panel. The aluminum tape member is provided with a plurality of openings. A data projector device can thus be obtained in which an excessive temperature rise at the front panel is prevented.

7 Claims, 7 Drawing Sheets

DATA PROJECTOR APPARATUS

BACKGROUND OF THE INVENTION

1. Field of the Invention

The present invention relates to a data projector apparatus, and particularly to a data projector apparatus in which a temperature rise at a front panel is suppressed.

2. Description of the Background Art

A projector apparatus is one of apparatuses for projecting images and the like on a screen. In a projector apparatus, light emitted from a light source is projected onto a screen. The light source includes, for example, a mercury lamp, a metal hydride lamp, a xenon lamp, or the like.

The light source becomes hot during illumination. Thus, the light source needs to be cooled. In order to cool the light source, for example, a projector apparatus described in Japanese Patent Laying-Open No. 2002-214703 is provided with a feed port 116 and a feed fan 117 on the bottom of a housing 120, as shown in FIG. 10. On the other hand, an exhaust port 118 and an exhaust fan 119 are provided on the rear surface of housing 120.

Feed fan 117 takes outside air from outside feed port 116 into housing 120 thereby to cool a light source 102 and the like.

In a projector apparatus 101 described in Japanese Patent Laying-Open No. 2000-35614, for example, a heat sink 130 is attached to a light source 102, and a cooling fan 131 is installed in the vicinity of light source 102, as shown in FIG. 11.

Cooling air is taken in while being sucked through cooling fan 131 thereby to cool light source 102 and heat sink 130.

Recently, a data projector apparatus for displaying visual information such as digital images based on digital signal processing has been proposed as a projector apparatus.

As shown in FIG. 12, in a data projector apparatus 101, light emitted from light source 102 passes through a color filter 102b to enter a prescribed device 104. This device 104 is a spatial light modulator in which mirrors 104a as high-speed digital optical switches corresponding to pixels in number are formed on a semiconductor chip.

Light that has entered device 104 is reflected by mirror 104a and changed in direction, for example, by approximately 90° with respect to the emitted direction. The redirected light is transmitted through a lens 114 to be projected on a screen (not shown).

In this manner, in data projector apparatus 101, light emitted from light source 102 is reflected by the prescribed device 104 to be projected onto the screen.

Now, it is required to bring light source 102, device 104 and lens 114 closer together to shorten an optical path from light source 102 to lens 114 in order to reduce the size of data projector apparatus 101 and to eliminate an effect in the middle of the optical path.

In order to do so, light source 102 and device 104 are arranged closer to front panel 110 provided with lens 114. Because of the arrangement of light source 102 and device 104 at the side of front panel 110, a board part 106 for processing signals is inevitably arranged to the rear side with respect to front panel 110.

Here, if air is supplied from light source 102 toward board part 106 in order to cool light source 102, the air warmed by light source 102 flows toward board part 106 and then possibly affects signal processing and the like in board part 106.

On the other hand, if air is supplied from light source 102 toward device 104, the control and the like on mirror 104a in device 104 may be affected by the air warmed by light source 102. On the contrary, if air is supplied from device 104 toward light source 102, the lateral width of housing 120 is increased.

Therefore, in order to cool light source 102, the air should be supplied from substrate 106 toward light source 102. A fan 108 for feeding air toward light source 102 is arranged, for example, between board part 106 and light source 102. In this case, an air intake port 116 is provided on the side or rear face of housing 120.

The air taken in from air intake port 116 and blown onto light source 102 by fan 108 is then delivered from front panel 110 to the outside of housing 120. Here, a relatively large opening cannot be provided at front panel 110 so as to prevent leakage of light from light source 102. In addition, provision of a large opening at front panel 110 is not preferable in view of the design.

Therefore, the air passes through a small gap (not shown) at front panel 110 and then exits outside housing 120. At that time, the air warmed by heat from light source 102 directly contacts front panel 110, and therefore the temperature of front panel 110 rises to approximately 100° C.

An approach for preventing a temperature rise at front panel 110 is disclosed, for example, in Japanese Patent Laying-Open No. 2001-330818, wherein a tape member having a high thermal conductivity is adhered on a portion where the temperature rises, and the heat of the member is dissipated.

However, this approach is disadvantageous in that the heat is conducted through the tape member thereby to excessively increase the temperature at that part of front panel 110 which is located around the tape member.

SUMMARY OF THE INVENTION

The present invention is made to solve the aforementioned problem. An object of the present invention is to provide a data projector apparatus in which an excessive temperature rise at a front panel is suppressed.

In accordance with one aspect of the present invention, a data projector apparatus for displaying digital information includes a housing including a front panel, a light source, a mirror part, a lens, a board part, a fan, an aluminum tape member, and a fin. The light source is arranged at a side of the front panel. The mirror part reflects light emitted and received from the light source into a predetermined direction. The lens is attached to the front panel for projecting the light reflected by the mirror part. The board part is arranged on that side of the light source which is opposite to the front panel, and has a function of generating a voltage of the light source. The fan is arranged between the light source and the board part for directing air taken in from outside the housing toward the light source. The aluminum tape member is attached to that part of a backside of the front panel which is opposed to the light source, and is provided with a plurality of predetermined openings for distributing a region in which a temperature rises in the front panel. The fin is arranged between the fan and the light source for feeding the air delivered by the fan intensively toward the region in which a temperature rises in the front panel.

In this structure, the aluminum tape member is attached to that part of the backside of the front panel which is opposed to the light source, and the aluminum tape member is provided with a plurality of predetermined openings. Accordingly, as compared with the aluminum tape member without such openings, where warm air passed through the light source comes into contact with the front panel and heat is conducted to that part of the front panel which is located around the aluminum tape member, the warm air passes through the openings whereby the heat conducted to that part of the front panel which is located around the aluminum tape member is partially conducted to that part of the front panel which is located around the opening. Therefore, the region in which a temperature rises is distributed in the front panel. Furthermore, the air delivered by the fan is fed by the fin intensively toward the region in which a temperature rises in the front panel. Accordingly, as compared with the case where air comes into contact with the front panel without such a fin, the region in which a temperature rises is expanded in the front panel. Therefore, since the region in which a temperature rises is expanded for the same heat quantity, a temperature rise per unit area is reduced. As a result, the occurrence of a region in which a temperature excessively rises can be effectively prevented in the front panel.

In accordance with another aspect of the present invention, a data projector apparatus for displaying digital information includes a housing including a front panel, a light source, a board part, a blower part, and a heat conductive seal member. The light source is arranged at a side of the front panel. The board part is arranged on that side of the light source which is opposite to the front panel, and has a function of controlling the light source. The blower part is arranged between the light source and the board part for directing air taken in from outside the housing toward the light source. The heat conductive seal member is attached to that part of a backside of the front panel which is opposed to the light source. The heat conductive seal member is provided with a plurality of predetermined openings for distributing a region in which a temperature rises in the front panel.

In this structure, the aluminum tape member is attached to that part of the backside of the front panel which is opposed to the light source, and the aluminum tape member is provided with a plurality of predetermined openings. Accordingly, as compared with the aluminum tape member without such openings, where warm air passed through the light source comes into contact with the front panel and heat is conducted to that part of the front panel which is located around the aluminum tape member, the warm air passes through the opening whereby the heat conducted to that part of the front panel which is located around the aluminum tape member is partially conducted to that part of the front panel which is located around the opening. Therefore, the region in which a temperature rises is distributed in the front panel. As a result, the occurrence of a region in which a temperature excessively rises can be effectively prevented in the front panel.

More specifically, the heat conductive seal member is formed of aluminum.

Therefore, heat can be conducted reliably.

Preferably, a fin arranged between the blower part and the light source is provided for feeding air delivered by the blower part intensively toward a region in which a temperature rises in the front panel.

In this case, the air delivered by the fan is fed by the fin intensively toward a region in which a temperature rises in the front panel. Therefore, as compared with the case where the air comes into contact with the front panel without such a fin, the region in which a temperature rises is expanded in the front panel. Accordingly, since the region in which a temperature rises is expanded for the same heat quantity, a temperature rise per unit area is reduced. As a result, the occurrence of a region in which a temperature excessively rises can be effectively prevented in the front panel.

In accordance with a further aspect of the present invention, a data projector apparatus for displaying digital information includes a housing including a front panel, a light source, a board part, a blower part, and a fin. The light source is arranged at a side of the front panel. The board part is arranged on that side of the light source which is opposite to the front panel, and has a function of controlling the light source. The blower part is arranged between the light source and the board part for directing air taken in from outside the housing toward the light source. The fin is arranged between the blower part and the light source for feeding air delivered by the blower part intensively toward a region in which a temperature rises in the front panel.

In this structure, the air delivered by the fan is fed by the fin intensively toward the region in which a temperature rises in the front panel. Therefore, as compared with the case where the air comes into contact with the front panel without such a fin, the region in which a temperature rises is expanded in the front panel. Accordingly, since the region in which a temperature rises is expanded for the same heat quantity, a temperature rise per unit area is reduced. As a result, the occurrence of a region in which a temperature excessively rises can be effectively prevented in the front panel.

Preferably, the fin is arranged to pass the air delivered by the blower part intensively through that part of the light source which emits light.

Therefore, the light source can be cooled reliably.

Preferably, a heat conductive seal member is provided to be attached to that part of a backside of the front panel which is opposed to the light source. The heat conductive seal member is provided with a plurality of predetermined openings for distributing a region in which a temperature rises in the front panel.

In this case, as compared with a heat conductive seal member without such an opening, where warm air passed through the light source comes into contact with the front panel and heat is conducted to that part of the front panel which is located around the heat conductive seal member, the warm air passes through the opening whereby the heat conducted to that part of the front panel which is located around the heat conductive seal member is partially conducted to that part of the front panel which is located around the opening. Therefore, the region in which a temperature rises is distributed in the front panel. As a result, the occurrence of a region in which a temperature excessively rises can be effectively prevented in the front panel.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
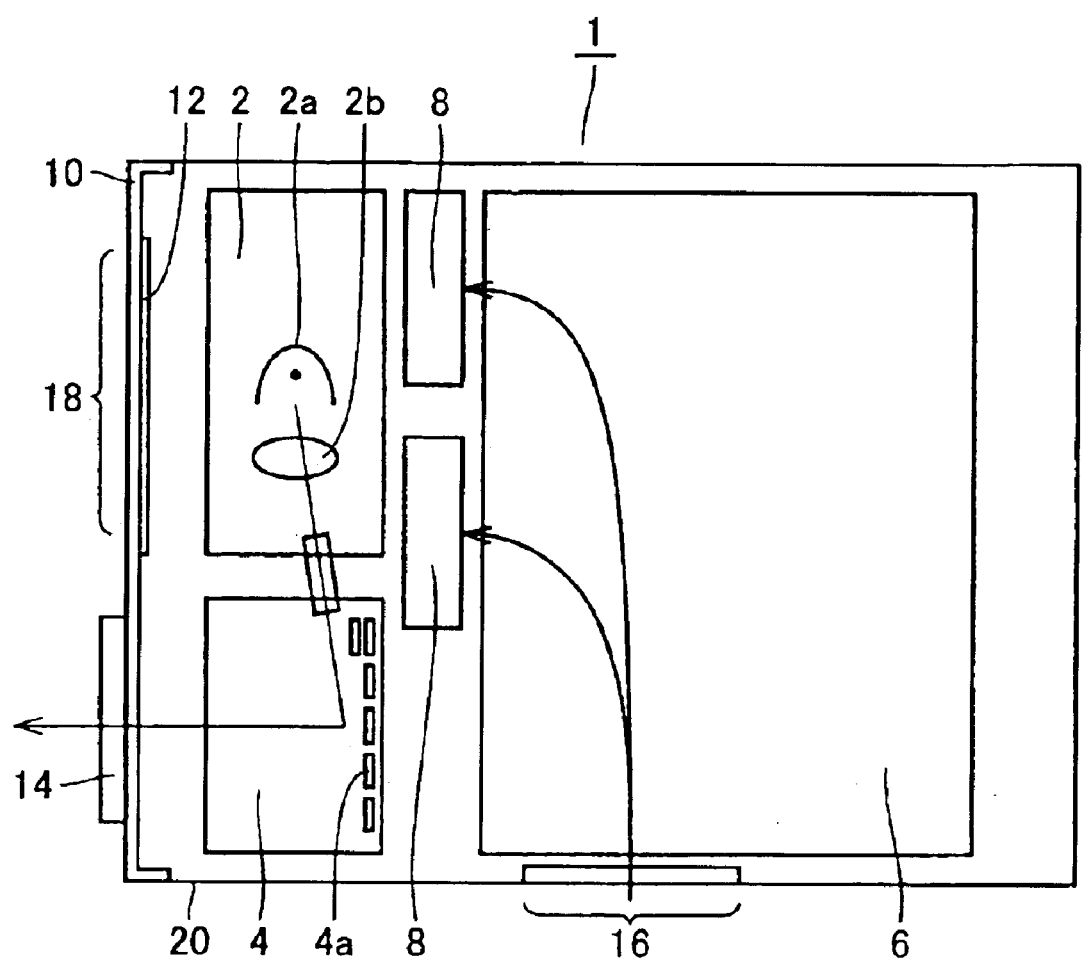
FIG. 1 is a top view of a data projector apparatus in accordance with an embodiment of the present invention.
Figure 2:
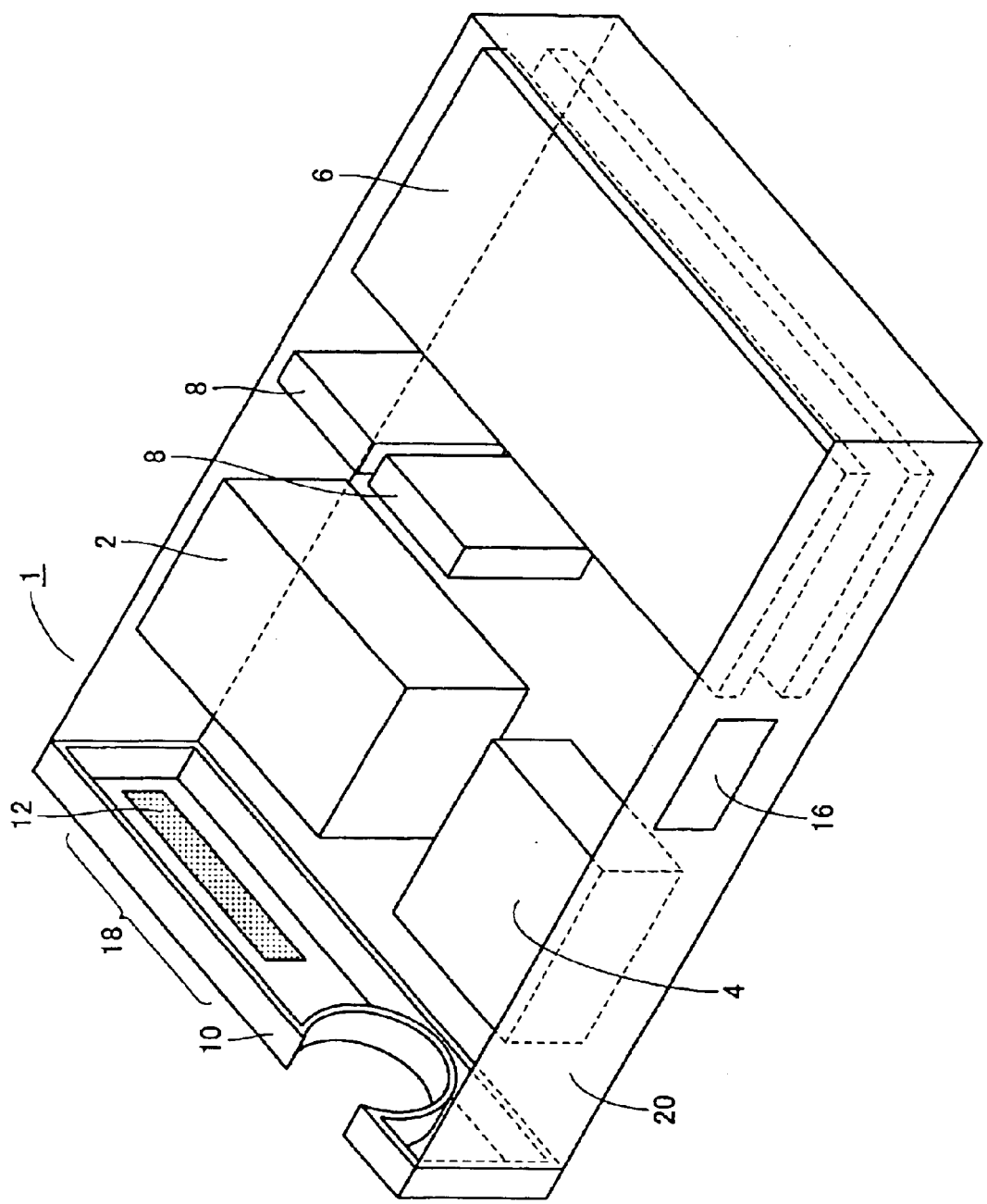
FIG. 2 is a perspective view of the data projector apparatus shown in FIG. 1 in the present embodiment.

A data projector apparatus in accordance with an embodiment of the present invention will be described. As shown in FIGS. 1 and 2, a light source 2, a device 4, a fan 8, a board part 6, and the like are arranged at their respective predetermined positions within a housing 20 including a front panel 10 of a data projector apparatus 1.

A halogen lamp 2a, for example, is used as light source 2. Device 4 is a spatial light modulator in which mirrors 4a as high-speed digital optical switches corresponding to pixels in number are formed on a semiconductor chip.

Light emitted from light source 2 passes through a prescribed color filter 2b to enter device 4. The incident light is reflected by mirror 4a. The light reflected by mirror 4a has its direction changed, for example, by approximately 90° C. with respect to the direction in which it is emitted from light source 2, and is then emitted toward lens 14. The light transmitted through lens 14 is projected onto a screen (not shown).

Light source 2 and device 4 are arranged closer to the side of front panel 10. On the other hand, board part 6 is arranged to the rear side opposite to front panel 10. Fan 8 is arranged between light source 2 and board part 6.

An air intake port 16 for taking air into housing 20 is formed on the side of housing 20. On the other hand, an air exhaust port 18 for exhausting air in housing 20 is formed on front panel 10.

Figure 3:
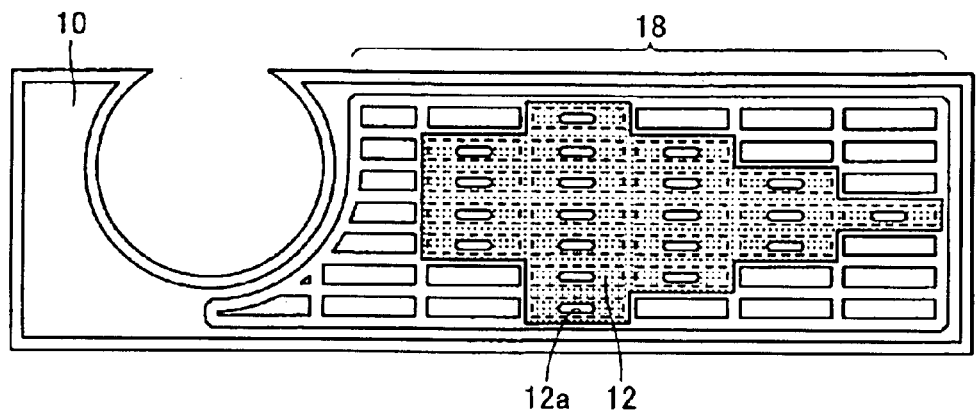
FIG. 3 shows a front panel and an aluminum tape member in the present embodiment.

Front panel 10 is formed, for example, of polycarbonate. An aluminum tape member 12 is attached on that part of the backside of front panel 10 which is opposed to light source 2. Aluminum tape member 12 is provided with a plurality of openings 12a, as shown in FIG. 3.

During an operation of data projector apparatus 1, air is taken from air intake port 16 into housing 20 using fan 8. The air taken into housing 20 flows from board part 6 toward light source 2.

Heat produced at light source 2 is conducted through air. The air that has increased in temperature due to heat transfer from light source 2 comes into contact with front panel 10 and then exits from a slit-like air exhaust port 18 on front panel 10 to the outside of housing 20.

Aluminum tape member 12 is attached to the part where the air increased in temperature comes into contact with front panel 10. In addition, aluminum tape member 12 is provided with a plurality of openings 12a.

Openings 12a formed in aluminum tape member 12 prevents the occurrence of a region in which a temperature excessively increases in front panel 10. This will now be described in detail.

Figure 4:
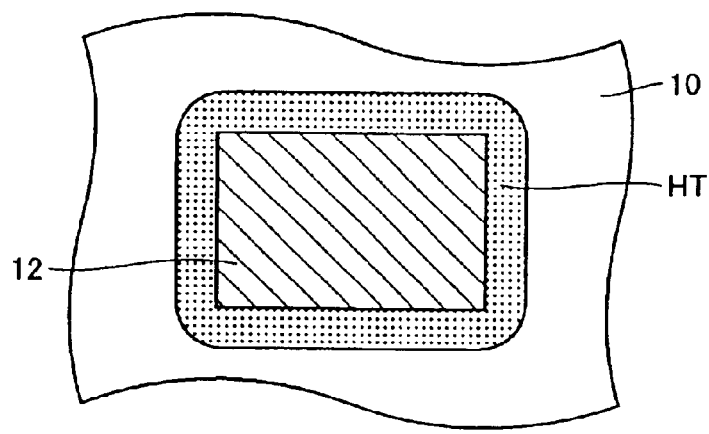
FIG. 4 is a first diagram schematically showing a temperature distribution in the front panel for illustrating an effect brought by attaching the aluminum tape member in the present embodiment.

First, as shown in FIG. 4, when an aluminum tape member without an opening is brought into contact with the air increased in temperature, heat is conducted to that part of front panel 10 which is located around aluminum tape member 12, causing a region HT in which the temperature at that part rises.

Figure 5:
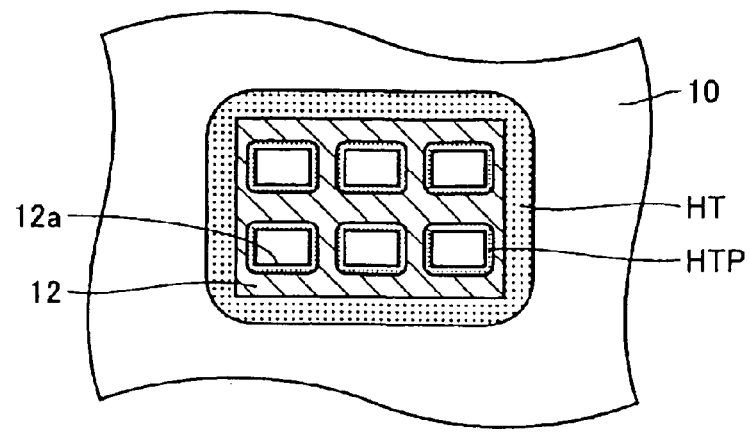
FIG. 5 is a second diagram schematically showing a temperature distribution in the front panel for illustrating an effect brought by attaching the aluminum tape member in the present embodiment.

On the other hand, as shown in FIG. 5, in the case of aluminum tape member 12 with a plurality of openings 12a, the air increased in temperature passes through openings 12a, so that the heat conducted to that part of front panel 10 which is located around aluminum tape member 12 is partially conducted to that part of front panel 10 which is located around opening 12a.

This causes a region HTP in which the temperature at that part of the front panel which is located around opening 12a rises. Meanwhile, in that part of front panel 10 which is located around aluminum tape member 12, the area of region HT in which a temperature rises is reduced because of region HTP.

Therefore, since the region in which a temperature rises is distributed in front panel 10, the occurrence of a region where the temperature excessively rises can be effectively prevented in front panel 10.

When an aluminum tape member is not attached to front panel 10, front panel 10 has a region with a temperature of approximately 100° C. By contrast, it was experimentally demonstrated that a temperature rise can be limited to approximately 80° C., at the highest, by attaching aluminum tape member 12 provided with opening 12a.

Figure 6:
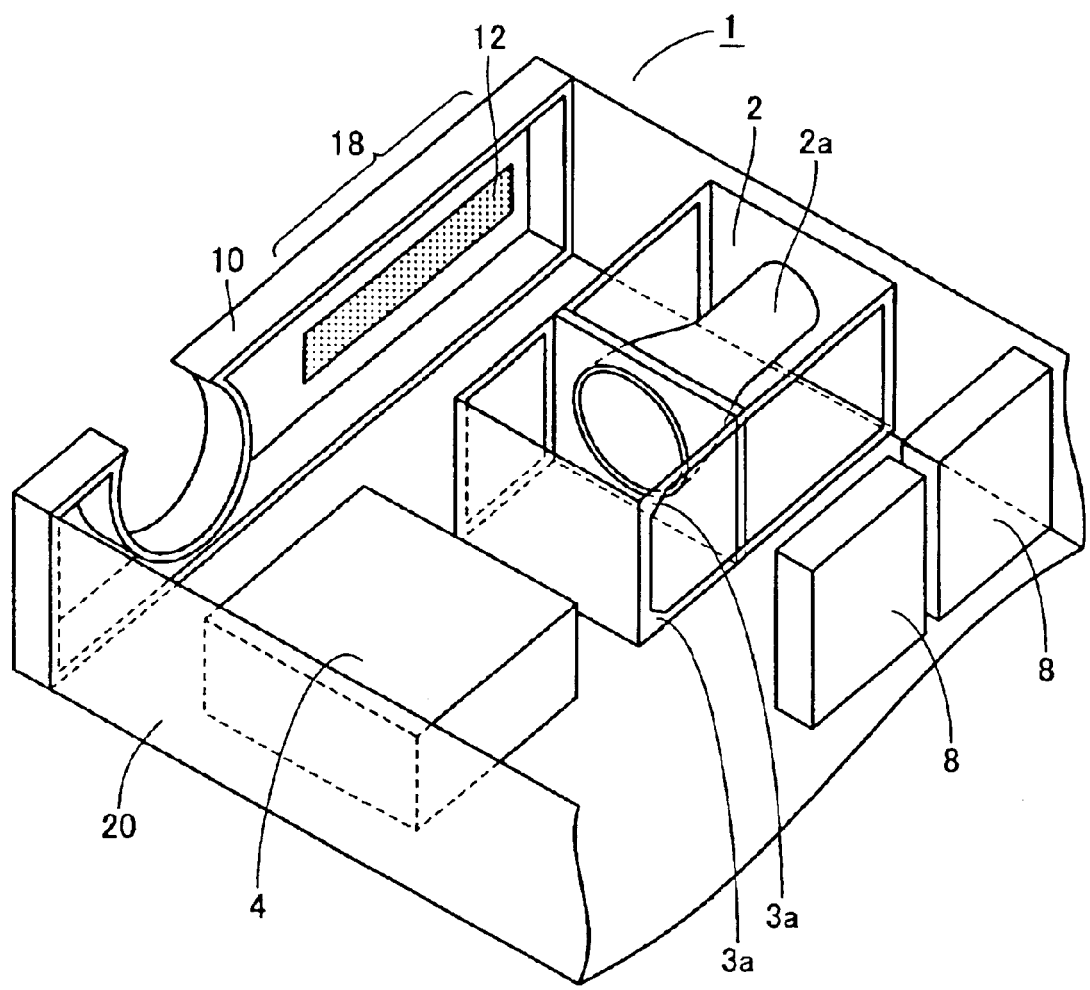
FIG. 6 is a partial perspective view of the data projector apparatus shown in FIG. 1 in the present embodiment.

In the present data projector apparatus, as shown in FIG. 6, a predetermined fin 3*1* is also provided between fan 8 and light source 2. Fin 3a is arranged to feed the air delivered by fan 8 intensively toward the region in front panel 10 in which a temperature rises.

The arrangement of fin 3a can also prevent the occurrence of a region in front panel 10 in which a temperature excessively rises. This will now be described in detail.

Figure 7:
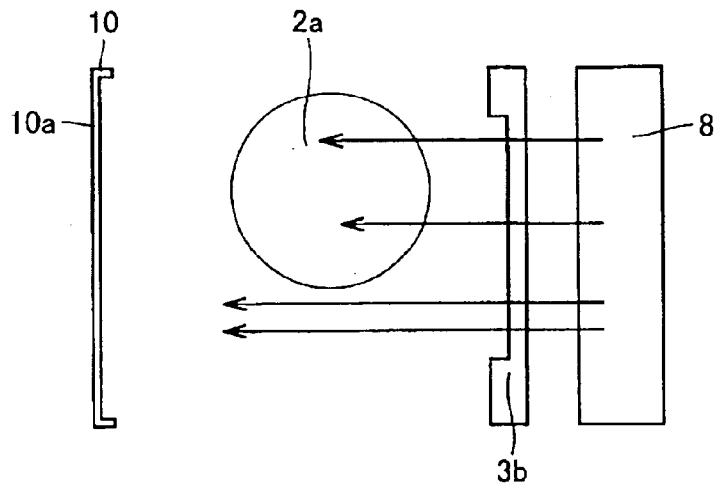
FIG. 7 is an illustration showing an air flow for illustrating an effect brought by arranging a fin in the present embodiment.

First, as shown in FIG. 7, when a member 3b without a fin is arranged, air delivered from fan 8 evenly passes through almost the entire region (space) provided with lamp (light source body) 2a of light source 2 and then comes into contact with front panel 10.

Figure 9:
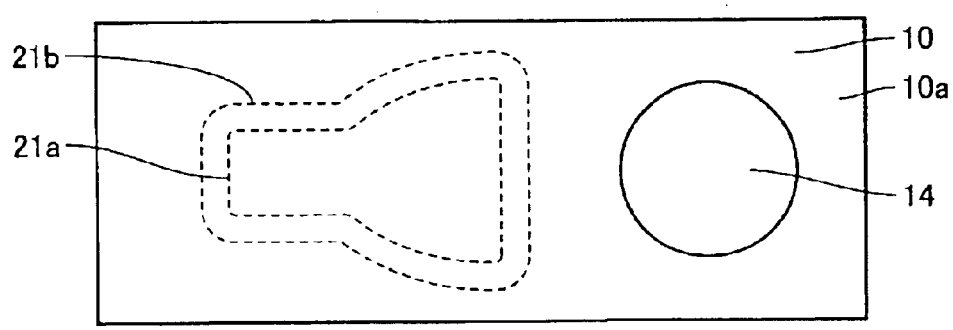
FIG. 9 is a diagram schematically showing a temperature distribution in the front panel for illustrating an effect brought by arranging the fin in the present embodiment.
Figure 10:
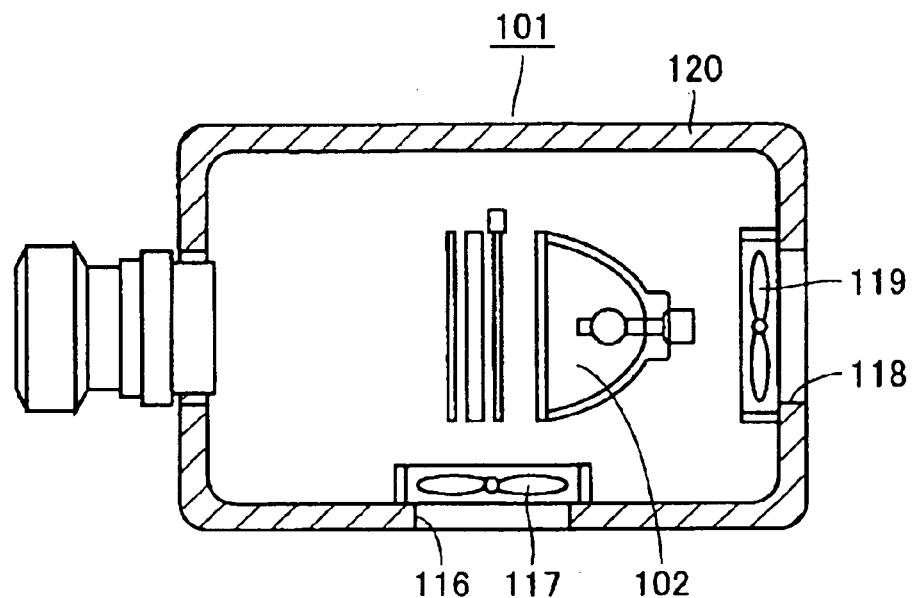
FIG. 10 is a cross sectional view of a conventional projector apparatus.
Figure 11:
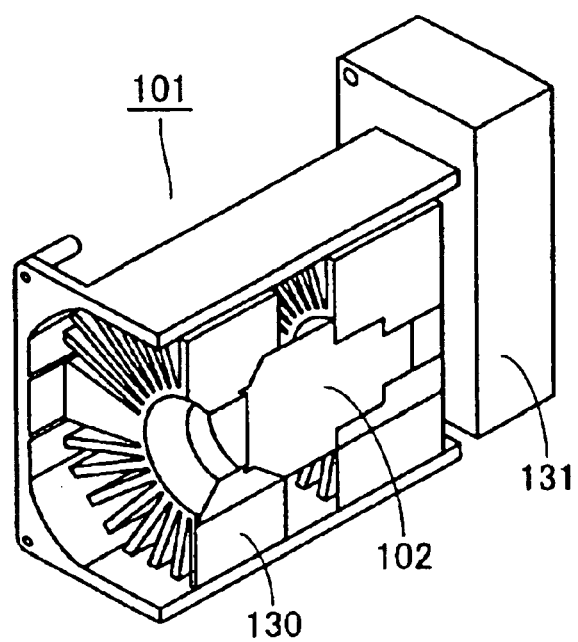
FIG. 11 is a cross sectional perspective view of another conventional projector apparatus.
Figure 12:
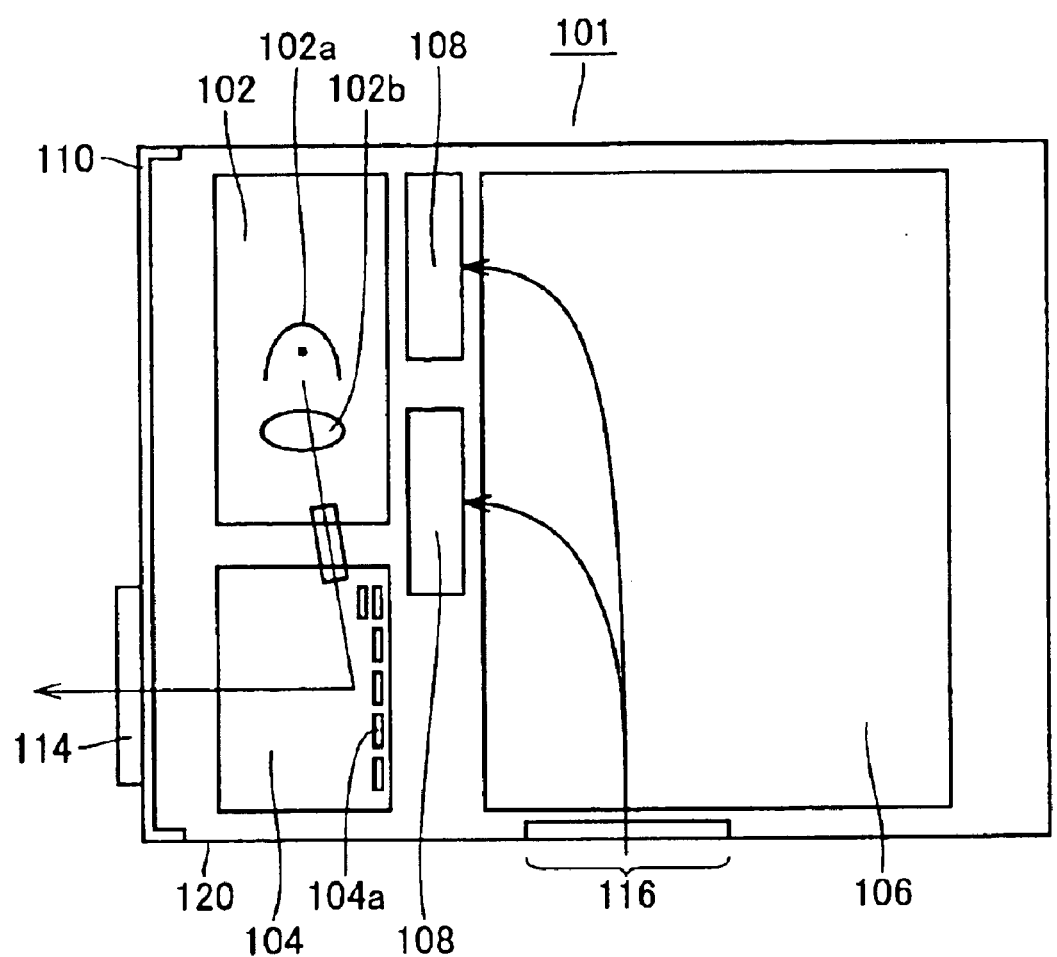
FIG. 12 is a top view of a conventional data projector apparatus.

Here, the heat is conducted through that part of the delivered air which passes. through the front face (a high temperature part) of lamp 2a, so that the temperature of that air is increased. As shown in FIG. 9, the air increased in temperature comes into contact with the backside of front panel 10, causing a region 21a of front panel 10 in which a temperature rises.

It is noted that FIG. 9 shows the region in which a temperature rises, as viewed from front side 10a of front panel 10, under the condition that no aluminum tape member is attached on the backside of front panel 10.

Figure 8:
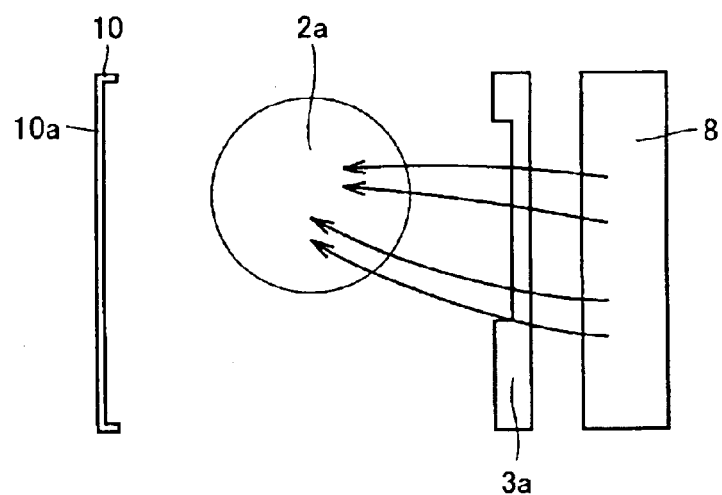
FIG. 8 is an illustration showing for comparison an air flow without a fin in the present embodiment.

On the other hand, as shown in FIG. 8, when fin 3a is arranged between fan 8 and lamp 2a, the air delivered from fan 8 passes intensively through the front face of lamp 2a from which light is emitted, so that heat is conducted from lamp 2a to the air thereby to increase the temperature of the air.

As shown in FIG. 9, the air increased in temperature comes into contact with the backside of front panel 10, causing a region 21b in which the temperature of front panel 10 rises.

In this case, the air delivered from fan 8 is intensively fed to the front face of lamp 2a and brought into contact with front panel 10, so that region 21b in which a temperature rises is expanded as compared with region 21a.

Therefore, since a region in which a temperature rises is expanded for the same heat quantity, a temperature rise per unit area is reduced. As a result, the occurrence of a region in which a temperature excessively rises is effectively prevented in front panel 10.

When fin 3a is not arranged, a region with a temperature of approximately 100° C. is created in front panel 10. By contrast, it was experimentally demonstrated that a temperature rise can be limited to approximately 95° C., at the highest, by arranging fin 3a.

Therefore, by attaching aluminum tape member 12 with a plurality of openings 12a on the backside of front panel 10 and by arranging fin 3a between fin 8 and light source 2 for feeding air intensively toward the entire surface of the lamp, the region in which a temperature excessively rises is distributed in front panel 10, and a temperature rise per unit area is reduced, whereby a temperature rise in front panel 10 can be prevented most effectively.

Although the data projector apparatus as described above has been illustrated with a heat conductive tape member made of aluminum, by way of example, a tape member made of a material having a high thermal conductivity such as copper may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data projector apparatus for displaying digital information, comprising:
    a housing including a front panel;
    a light source arranged at a side of said front panel;
    a mirror part for reflecting light emitted and received from said light source into a predetermined direction;
    a lens attached to said front panel for projecting the light reflected by said mirror part;
    a board part arranged on that side of said light source which is opposite to said front panel, and having a function of generating a voltage of said light source;
    a fan arranged between said light source and said board part for directing air taken in from outside said housing toward said light source;
    an aluminum tape member attached to that part of a backside of said front panel which is opposed to said light source, and provided with a plurality of predetermined openings for distributing a region in which a temperature rises in said front panel; and
    a fin arranged between said fan and said light source for feeding the air delivered by said fan intensively toward the region in which a temperature rises in said front panel.

2. A data projector apparatus for displaying digital information, comprising:
    a housing including a front panel;
    a light source arranged at a side of said front panel;
    a board part arranged on that side of said light source which is opposite to said front panel, and having a function of controlling said light source;
    a blower part arranged between said light source and said board part for directing air taken in from outside said housing toward said light source; and
    a heat conductive seal member attached to that part of a backside of said front panel which is opposed to said light source, wherein
    said heat conductive seal member is provided with a plurality of predetermined openings for distributing a region in which a temperature rises in said front panel.

3. The data projector apparatus according to claim 2, wherein said heat conductive seal member is formed of aluminum.

4. The data projector apparatus according to claim 2, further comprising a fin arranged between said blower part and said light source for feeding air delivered by said blower part intensively toward a region in which a temperature rises in said front panel.

5. A data projector apparatus for displaying digital information, comprising:
    a housing including a front panel;
    a light source arranged at a side of said front panel;
    a board part arranged on that side of said light source which is opposite to said front panel, and having a function of controlling said light source;
    a blower part arranged between said light source and said board part for directing air taken in from outside said housing toward said light source; and
    a fin arranged between said blower part and said light source for feeding air delivered by said blower part intensively toward a region in which a temperature rises in said front panel.

6. The data projector apparatus according to claim 5, wherein said fin is arranged to pass the air delivered by said blower part intensively through that part of said light source which emits light.

7. The data projector apparatus according to claim 5, further comprising a heat conductive seal member attached to that part of a backside of said front panel which is opposed to said light source, wherein
    said heat conductive seal member is provided with a plurality of predetermined openings for distributing a region in which a temperature rises in said front panel.

* * * * *

UNITED STATES PATENT AND TRADEMARK OFFICE
CERTIFICATE OF CORRECTION

PATENT NO.    : 6,939,010 B2
DATED         : September 6, 2005
INVENTOR(S)   : Yuya Tanaka It is certified that error appears in the above-identified patent and that said Letters Patent is hereby corrected as shown below:

Title page,
Item [73], Assignee, please replace "Funai Electric Co. Ltd." with -- Funai Electric Co., Ltd. --.

Signed and Sealed this

Fifteenth Day of November, 2005

JON W. DUDAS
*Director of the United States Patent and Trademark Office*